United States Patent [19]

Mittelhäuser

[11] Patent Number: 4,973,820
[45] Date of Patent: Nov. 27, 1990

[54] EXTERNAL REAR VIEW MIRROR FOR A MOTOR VEHICLE

[76] Inventor: Bernhard Mittelhäuser, Am Krähenberg, 3002 Wedemark 2, Fed. Rep. of Germany

[21] Appl. No.: 337,961
[22] Filed: Apr. 14, 1989

[30] Foreign Application Priority Data

Apr. 19, 1988 [DE] Fed. Rep. of Germany ....... 3812993

[51] Int. Cl.$^5$ ............................................. H05B 3/84
[52] U.S. Cl. .................................... 219/219; 350/588
[58] Field of Search ................ 219/219, 202; 350/588, 350/582

[56] References Cited

U.S. PATENT DOCUMENTS 3,052,787  9/1962  Williams ................................ 219/219
3,624,347  11/1971  Todd ..................................... 219/219
4,715,698  12/1987  Haba ..................................... 350/588

FOREIGN PATENT DOCUMENTS 2147345  4/1972  Fed. Rep. of Germany ...... 219/219
1545770  5/1979  United Kingdom ................ 219/219

Primary Examiner—Teresa J. Walberg
Attorney, Agent, or Firm—Robert W. Becker & Associates

[57] ABSTRACT

An external rear view mirror for a motor vehicle is provided, and includes an electrically heatable mirror body that is detachably connectable to a holder that is adjustable in all directions. In order to simplify mounting of the mirror body, the electrical leads for the heating are connected to the holder. In addition, both the holder and the mirror body are provided with electrical contacts that communicate with one another when the mirror body is mounted on the holder.

7 Claims, 1 Drawing Sheet

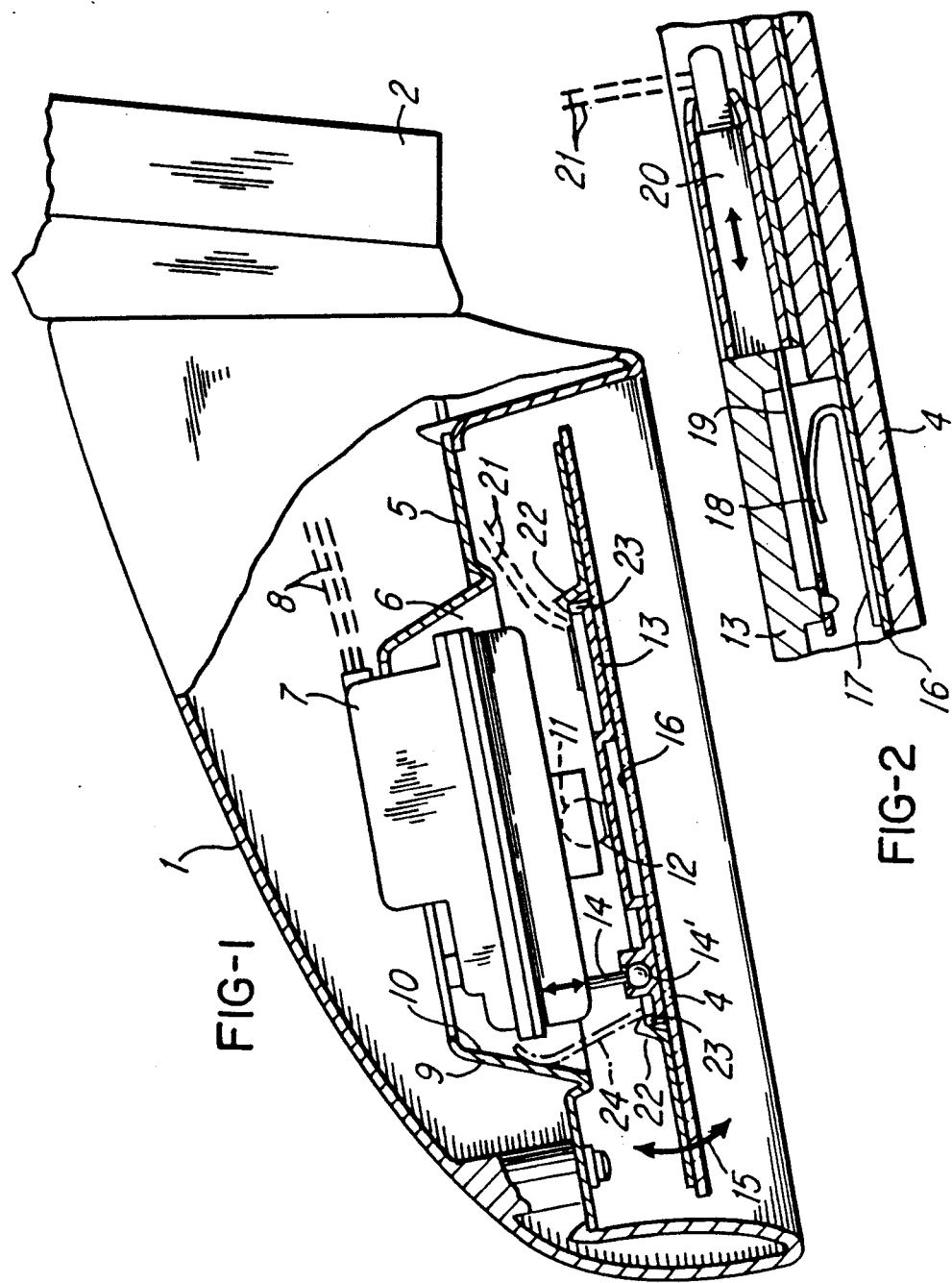

EXTERNAL REAR VIEW MIRROR FOR A MOTOR VEHICLE

BACKGROUND OF THE INVENTION

The present invention relates to an external rear view mirror for a motor vehicle, and includes an approximately dish-shaped housing that is open toward one side and in which is disposed a holder that is adjustable in all directions, with an electrically heatable mirror body being detachably connectable to the holder.

With heretofore known mirrors of this general type, the back side of the mirror body is provided with securely attached leads for the resistive heating; the leads end in plugs, with which are associated cooperating contacts that are securely mounted in the housing. Accordingly, during mounting of the mirror body, the plug connection must first be established in order only thereafter to be able to place the mirror body in its operative position, for example by pressing the mirror body into its ball-and-socket joint.

It is an object of the present invention to considerably simplify mounting of the mirror body in order to thus be able to rapidly treat or handle the mirror without its mirror body, for example for painting purposes, and then again be able to easily and quickly provide the mirror with its mirror body.

BRIEF DESCRIPTION OF THE DRAWING

This object, and other objects and advantages of the present invention, will appear more clearly from the following specification in conjunction with the accompanying schematic drawing, in which:

FIG. 1 is a horizontal cross-sectional view through one exemplary embodiment of the inventive external rear view mirror for a motor vehicle; and FIG. 2 is a horizontal cross-sectional view through a portion of the mirror of FIG. 1, and in particular in the region of the connection of the cable lead on the holder for the heating of the mirror body.

SUMMARY OF THE INVENTION

The mirror of the present invention is characterized primarily by: electrical lead means for the electrical heating, with these lead means being connected to the holder; first electrical contact means that are provided on the mirror body; and second electrical contact means that are provided on the holder and are in communication with the lead means, whereby when the mirror body is mounted on the holder, the first and second electrical contact means communicate with one another.

Consequently, pursuant to the present invention the electrical line for the heating, rather than being a floating line connected directly to the mirror body, is an electrical line that first leads to the holder, which is adjustable in all directions; the holder, as well as the mirror body, are provided with electrical contacts that are electrically connected to one another when the mirror body is mounted, for example by being pressed into its ball-and-socket joint. In so doing, since the contact of the holder is connected to the electrical leads, the mirror body is then finish assembled, with its electrical heating being connected and ready for operation.

Further specific features of the present invention will be described in detail subsequently.

DESCRIPTION OF PREFERRED EMBODIMENTS

Referring now to the drawing in detail, the approximately dish-shaped housing 1 of the mirror is mounted to the vehicle via a base 2. In a customary manner, the opening 3 of the housing, in which the mirror body 4 is disposed, faces counter to the forward direction of travel of the vehicle.

Disposed within the housing 1 is a mounting plate 5 that has an approximately centrally disposed opening 6 in which is securely mounted the electrical drive unit 7, which is in the form of an electric drive. The leads are designated by the reference numeral 8. The opening 6 is delimited by a collar 9 having conical inner faces 10.

Disposed on that side of the drive unit 7 that faces the opening 3 is a socket 11 for receiving a ball 12 that is securely connected with an approximately plate-shaped holder 13. The edge region of the holder 13 is provided with two sockets 14' that are offset by 90° from one another. Push rods 14, which are longitudinally movable by the drive unit 7, extend into the sockets 14' so that, via a movement of the push rods 14, it is possible to pivot the holder 13 and hence to adjust the mirror, and in particular in the direction of the double arrow 15.

The holder 13 serves for the detachable securement of the mirror body 4, the back side of which is provided with electrical heating wires in the layer 16 in order to be able to heat the mirror body 4.

Disposed on the back side of the mirror body 4, i.e. on the layer 16 thereof, is a fixedly mounted contact spring 17. The free, resilient end 18 of the contact spring 17 rests against the underside of a contact 19 that is fixedly mounted on the holder 13. The contact 19 leads to a plug connection 20 and the two electrical leads 21 for the electrical heating of the mirror body 4.

The mirror body 4 is detachably secured to the holder 13. For this purpose, the mirror body 4 is provided with snap or spring catches 22 that are secured or otherwise fixedly attached thereto; the catches 22 engage a raised edge 23 of the holder 13.

To mount the mirror body 4 with its layer 16, the contact spring 17, and the spring catches 22, the mirror body 4 is pressed onto the holder 13, as a consequence of which the spring catches 22 are deformed and assume the operating position illustrated in FIG. 1. During assembly, the resilient end 18 of the contact spring 17 is bent somewhat in a direction toward the layer 16 in order in this manner to be able to bring about a good contact between the end 18 and the contact 19. Thus, mounting or assembly of the mirror body 4 onto the holder 13 automatically effects the electrical connection for the electrical heating of the mirror body 4.

The edge region of the holder 13 can also be provided with damping elements 24 that resemble flat springs and rub against the inner face 10 of the collar 9.

It should be noted that the mirror body 4, i.e. its holder 13 is not limited to the described drive unit: for example, Bowden cables, spindles, or hydraulic means could also be provided. However, the important thing is that the holder 13 be capable of being adjusted in all directions and provide a detachable mounting for the mirror body, whereby a contact connection is also provided during mounting of the mirror body. In this connection, the holder can be provided with either fixedly installed leads 21, or also with plug connections.

In the case of a plug connection for the leads 21, this connection should be disposed in the edge portion of the holder 13, and the plug direction, i.e. the direction of insertion, should extend parallel to the holder 13, i.e. to the mirror body 4.

The term mirror body as used in conjunction with the present application refers to the actual mirror, the layer 16, the contact 17, the spring catches 22, and, if provided, the damping elements 24.

The present invention is, of course, in no way restricted to the specific disclosure of the specification and drawing, but also encompasses any modifications within the scope of the appended claims.

What I claim is:

1. In an external rear view mirror for a motor vehicle, including an approximately dish-shaped housing that is open toward one side and in which is disposed a holder that is adjustable in all directions, with an electrically heatable mirror body being detachably connectable to said holder, the improvement comprising;
   electrical lead means for said electrically heatable mirror body, with said lead means being connected to said holder;
   first electrical contact means provided on said mirror body; and
   second electrical contact means provided on said holder and in communication with said electrical lead means, whereby when said mirror body is mounted on said holder, said first and second electrical contact means communicate with one another;
   at least one of said first and second electrical contact means being resilient in a press-on direction of said mirror body;
   said first electrical contact means a leaf spring means, and having a portion that is fixedly connected to said mirror body as well as an end that is adapted to be deflected in a direction toward said mirror body.

2. A mirror according to claim 1, in which said electrical lead means is detachably connected to said holder.

3. A mirror according to claim 2, which includes plug means for effecting said detachable connection.

4. A mirror according to claim 3, in which said plug means is provided with an insertion direction that extends approximately parallel to said mirror body.

5. A mirror according to claim 1, in which said second electrical contact means of said holder extends approximately parallel to said mirror body.

6. A mirror according to claim 1, which includes friction damping means disposed between said housing and said holder.

7. A mirror according to claim 6, which includes means disposed in said housing for carrying drive means for said mirror, with said friction damping means being in operative contact with said carrying means.

* * * * *